United States Patent Office 3,655,668
Patented Apr. 11, 1972

3,655,668
1,1'-METHYLENEBIS[4-(3-CHLOROPHENYL)
PIPERAZINE]
Frederick J. McCarty, Dresher, Pa., assignor to
Richardson-Merrell Inc., New York, N.Y.
No Drawing. Filed June 25, 1969, Ser. No. 836,615
Int. Cl. C07d 51/70
U.S. Cl. 260—268 PH          1 Claim

ABSTRACT OF THE DISCLOSURE

The new compound, 1,1' - methylenebis[4 - (3-chlorophenyl)piperazine], has useful analgesic, anti-inflammatory, and antipyretic properties and may be administered orally and parenterally. It is made by the reaction of Formalin on 3-chlorophenylpiperazine in an alcoholic solution.

---

This invention relates to a new chemical compound having useful pharmacological properties and to methods of preparing the same. The compound of this invention, 1,1'-methylenebis[4-(3-chlorophenyl)piperazine], has the formula:

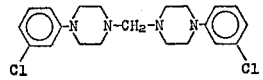

It is a white solid, insoluble in water, and melting at 119° to 121° C.

The compound may be prepared by the dropwise addition of Formalin to an alcoholic solution of 3-chlorophenylpiperazine.

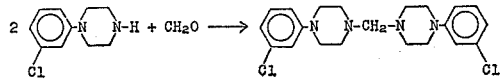

Upon cooling, the desired product precipitates from the reaction mixture.

Alternately, methylene iodide may be substituted for Formalin in the above reaction.

The compound of this invention unexpectedly possesses six times the analgesic activity of the known compound 1,1'-methylenebis[4-phenylpiperazine]. Unlike standard analgesics which are active only at or close to doses which produce overt symptomatology, the compound of this invention induces analgesia at doses below those causing overt central nervous system depression. It is a potent, orally effective analgesic with a high therapeutic index. It also has useful anti-inflammatory and antipyretic properties. The spectrum of activity of this new compound differs somewhat from that of known analgesics with which it was compared, including aspirin, dextropropoxyphene, codeine, and morphine.

In the mouse, the compound is active in the phenylquinone writhing test, the Haffner tail clamp and hot plate tests, but is relatively ineffective in the tail flick test. The inactivity of the compound in the tail flick test is also true in rats which indicates that the compound acts on pain—at least in part—by an effect on higher nerve centers.

Analgesia was demonstrated in the mouse at doses of 3 to 8 milligrams per kilogram of body weight when administered orally. These dosages are below those which cause overt central nervous system depression. The analgesics such as codeine and d-propoxyphene are analgesic in mice only at or close to doses which produce overt symptomatology.

In the rat analgesic activity was demonstrated with the new compound of the present invention in the phenylquinone writhing and pressure pain (inflamed paw) tests at doses of 4 milligrams per kilogram of body weight and above. The minimal dose in rats which produced observable central nervous system depression was about 8 milligrams per kilogram when administered orally. The new compound was active in the normal paw pressure pain test at doses above 8 milligrams per kilogram. The greater effect of the compound against inflammatory paw pain than non-inflammatory pain resembles the action of aspirin and other salicylates. However, the new compound of the invention is different from and superior to aspirin in its analgesic profile of activity since it is effective in the mouse tail clamp and hot plate tests whereas aspirin is inactive.

The new compound of the invention also exerted significant anti-inflammatory activity in rats at doses of 2 to 8 milligrams per kilogram and above in the brewer's yeast and carrageenin paw edema tests. In addition, the new compound produced significant antipyretic effects in rats at doses of 3 to 8 milligrams per kilograms. In these studies pyresis was induced in the rats by subcutaneous injection of brewer's yeast.

The compound of the invention had no intestinal spasmogenic effect and failed to produced respiratory depression in dogs or Straub tail effects in mice. In contrast to aspirin and other non-steroidal anti-inflammatory agents, the new compound of the invention was non-irritating to the gastric mucosa of rats at maximally tolerated doses. It had no significant effect on the blood pressure of conscious dogs at a symptomatic dose of 50 milligrams per kilogram per os. In anesthetized normotensive dogs, a hypotensive effect was observed at high doses of 25 milligrams per kilogram when administered intraduodenally. The compound had no consistent effect on cardiac output, peripheral resistance, respiration, or intestinal motility at doses up to 100 milligrams per kilogram, intraduodenally.

The compound is effective orally, topically, and parenterally and may be used at doses ranging from 0.01 milligram per kilogram of body weight up to 10 milligrams per kilogram. It may be administered in the usual dosage forms such as in tablets, capsules, injectable suspensions and solutions, suppositories, in syrups, or applied as ointments, and the like containing the desired amount of the drug.

The new compound of the present invention may be prepared as described in the following example, and modifications thereof.

EXAMPLE 1,1'-methylenebis[4-(3-chlorophenyl)piperazine]

A solution of 982.5 grams of N-(3-chlorophenyl)piperazine in 4 liters of ethanol was stirred and treated, dropwise, with 250 milliliters of Formalin during a 30 minute period. The reaction mixture was stirred two hours, cooled, and filtered. The product was recrystallized from ethanol to give 730 grams of white solid, melting point 119° to 121° C.

What is claimed is:
1. 1,1'-methylenebis[4-(3-chlorophenyl)piperazine].

References Cited
UNITED STATES PATENTS

| | | | |
|---|---|---|---|
| 2,997,474 | 8/1961 | Janssen | 260—268 PH |
| 3,558,266 | 1/1971 | Kleemann | 260—268 X |

OTHER REFERENCES

Butler, Jour. Am. Chem. Soc., vol. 78, p. 482–3 (1956).
Forsee et al.: Jour. Am. Chem. Soc., vol. 57, p. 2363–4 (1935).

DONALD G. DAUS, Primary Examiner

U.S. Cl. X.R.
424—250